(12) United States Patent
White

(10) Patent No.: US 8,832,915 B2
(45) Date of Patent: Sep. 16, 2014

(54) APPARATUS AND METHOD FOR THE CONNECTION OF CONDUITS

(75) Inventor: John White, Knaphill (GB)

(73) Assignee: Verderg Connectors Limited, Knaphill (GB)

( * ) Notice: Subject to any disclaimer, the term of this patent is extended or adjusted under 35 U.S.C. 154(b) by 267 days.

(21) Appl. No.: 13/262,615

(22) PCT Filed: Mar. 31, 2010

(86) PCT No.: PCT/GB2010/050556
§ 371 (c)(1),
(2), (4) Date: Dec. 19, 2011

(87) PCT Pub. No.: WO2010/112920
PCT Pub. Date: Oct. 7, 2010

(65) Prior Publication Data
US 2012/0090152 A1    Apr. 19, 2012

(30) Foreign Application Priority Data

Apr. 2, 2009 (GB) .................................. 0905713.4

(51) Int. Cl.
*B23P 11/00* (2006.01)
*B23P 19/10* (2006.01)
*F16L 1/16* (2006.01)
*F16L 37/00* (2006.01)
*E21B 41/04* (2006.01)
*F16L 1/26* (2006.01)
*E21B 43/013* (2006.01)

(52) U.S. Cl.
CPC ................. *F16L 1/26* (2013.01); *F16L 37/002* (2013.01); *E21B 41/04* (2013.01); *E21B 43/013* (2013.01)

USPC .......... 29/237; 29/281.1; 29/466; 29/525.01; 29/525.02; 29/464; 29/468; 405/169

(58) Field of Classification Search
USPC ......... 29/466, 468, 237, 282, 525.01, 525.02, 29/464; 405/169–170, 173, 184.1, 184.4
See application file for complete search history.

(56) References Cited

U.S. PATENT DOCUMENTS 2,548,216 A    4/1951   Houghton et al. ............ 285/129
3,059,947 A    10/1962  Felburg et al. ............... 285/410
(Continued)

FOREIGN PATENT DOCUMENTS

EP    1956184 B1    8/2008
GB    2417534 A     3/2006
(Continued)

OTHER PUBLICATIONS

International Search Report, mailed Aug. 3, 2010, for PCT/GB2010/050556, 5 pages.

*Primary Examiner* — Alexander P Taousakis
*Assistant Examiner* — Matthew P Travers
(74) *Attorney, Agent, or Firm* — Seed IP Law Group PLLC

(57) ABSTRACT

An apparatus for connecting adjacent ends of first and second conduits including a frame assembly including a mounting point for mounting the end of the first conduit in a fixed position, a guide connected to the frame assembly and including first and second guide formations for receiving guide arms attached to the end of the second conduit and a moveable carrier mounted on the frame and including slots for engaging the guide arms. The carrier is moveable between a first position in which the slots align with the guide formations so that the guide arms can pass into the slots, and a second position in which the end of the second conduit is held against the end of the first conduit so as to allow a connection to be formed to secure the ends together.

13 Claims, 12 Drawing Sheets

(56) References Cited

U.S. PATENT DOCUMENTS

| | | | |
|---|---|---|---|
| 3,151,373 A | 10/1964 | Whitcomb | 24/279 |
| 3,775,985 A * | 12/1973 | Shaw | 405/166 |
| 4,076,130 A | 2/1978 | Sumner | 214/1 PA |
| 4,915,422 A * | 4/1990 | Chacon et al. | 285/39 |
| 5,206,980 A * | 5/1993 | Chapman | 29/237 |
| 6,997,645 B2 * | 2/2006 | von Trepka et al. | 405/170 |
| 2001/0010782 A1 | 8/2001 | Corbetta | 405/170 |
| 2002/0014772 A1 | 2/2002 | Amedure et al. | 285/373 |
| 2005/0258641 A1 * | 11/2005 | Gibb | 285/112 |
| 2007/0009328 A1 * | 1/2007 | Bastesen et al. | 405/169 |
| 2007/0126234 A1 | 6/2007 | Wirth et al. | 285/410 |
| 2007/0269270 A1 * | 11/2007 | Bastesen et al. | 405/170 |

FOREIGN PATENT DOCUMENTS

| | | |
|---|---|---|
| GB | 2440808 A | 2/2008 |
| GB | 2442972 A | 4/2008 |
| WO | 03/050443 A1 | 6/2003 |
| WO | 2008/063080 A1 | 5/2008 |
| WO | 2009/092240 A1 | 7/2009 |

* cited by examiner

APPARATUS AND METHOD FOR THE CONNECTION OF CONDUITS

TECHNICAL FIELD

This invention relates to apparatus and methods for aligning conduits for connection together. In particular conduits such as those used in the oil and gas industry.

BACKGROUND ART

When connecting a pipeline, or other conduit, to another pipeline or structure, a connection tool can be used to bring together the end of the pipelines to be connected. FIG. 1 shows a typical riser tower subsea installation featuring a number of situations where connections need to be made between conduits. For example a riser tower 10 is moored to the seabed 12 and connected to a surface production platform 14 such as a FPSO. Typical connections points that can be present in such an assembly exist between jumpers 16 that run from the riser tower 10 to flow line termination assemblies 18 (FTA), between FTAs 18 and pipelines 20 on the seabed 12 and between pipelines connecting production manifolds 22 and subsea trees 24 at the start of subsea oil well.

The conduits may be pipelines or cables for containing fluids, e.g. liquid or gas, and/or may contain electrical, hydraulic and/or optical services to be connected. Connections may be joining one length of a conduit to another, i.e. a midline connection, or connections may be at the start or finish point of the conduit, i.e. a termination connection, to another apparatus.

FIG. 2 shows the connection of a first conduit 26 with a second conduit 28 having a seal 30 between the end faces of the conduits and a closure mechanism 32, such as a clamp, around the hub of the connection. The point in the connection where the content of the conduits passes from one side of the connection to the other is defined as the interface 34.

In order for a satisfactory connection to be achieved the conduits must be sufficiently aligned for the liquid, gas, electricity, light etc to pass across the interface. The accuracy that needs to be achieved with the alignment can depend on the nature of the conduit and the nature of the contents of the conduits (liquid, gas, electricity, light etc). Typically the accuracy required will be specified in millimeters. Alignment is generally achieved through a series of steps carried out by a connection tool each step providing more accurate alignment until the final stage brings the conduits together with the accuracy required for the content of the conduit to pass across the interface and still remain contained within the conduit.

The conduits must also be bought into contact with each other with sufficient force and intimacy to ensure whatever seals or devices required to contain the contents of the conduits are retained and/or activated.

The conduits must then be able to be securely retained in the closed position by a closure device that resists both internal and external forces that the connection may be subjected to throughout its service life.

Currently available alignment and closure mechanisms can be both heavy and large. As the connector size and weight increases so does the cost of the equipment and processes required to install and operate the connector. This is particularly true when stiff conduits are being connected and or large diameter conduits are being connected where the loads required to achieve satisfactory alignment are high.

EP1956184 and US20010010782 describe methods and apparatus for aligning and connecting conduits.

It is an object of the invention to minimise the size and weight of the connecting tool required. This would also minimise the cost of equipment and the processes required to install the connection.

DISCLOSURE OF THE INVENTION

This invention provides an apparatus for connecting adjacent ends of first and second conduits comprising:
- a frame assembly including a mounting point for mounting the end of the first conduit in a fixed position;
- a guide connected to the frame and including first and second guide formations for receiving guide arms attached to the end of the second conduits; and
- a moveable carrier mounted on the frame and including slots for engaging guide arms, the carrier being moveable between a first position in which the slots align with the guide formations so that the guide arms can pass into the slots, and a second position in which the end of the second conduit is held against the end of the first conduit so as to allow a connection to be formed to secure the ends together.

The guide can comprise a pair of side members, defining a space therebetween for receiving the end of the second conduit, the first and second guide formations being provided in each side member.

The side members can include channels within which the carrier slides so as to move between the first and second positions, the guide formations in each side member opening into the respective channel The slots in the carrier locate the guide arms such that the end of the second conduit is positioned co axially with the end of the first conduit fixed to the frame.

The guide formations can include retaining mechanisms to prevent accidental disengagement of the guide arms during use.

The apparatus can comprise a drive mechanism that is fixed to the frame and connects to the carrier and is operable to move the carrier between the first and second positions. The driving mechanism can be detachable from the carrier.

The apparatus may comprise a closure mechanism connected to the frame and operable to form the connection to secure the ends of the conduits together when the end of the second conduit is in the second position.

The closure mechanism can comprise a clamping assembly including a plurality of clamp segments and an actuating mechanism operable to force the clamp segments into engagement with formations on the ends of the conduits to secure the ends together.

The apparatus can comprise a pair of clamp segments and a pair of actuators extending between the clamp segments on either side of the connection. In one embodiment the closure mechanism comprises clamp segments mounted on a mounting member by means of hinges and connected to each other by an actuator. In another embodiment the closure mechanism comprises clamp segments connected by a flexible band that can pass around the ends of the conduits, the band having a lug at each end and an actuator extending between the lugs.

A second aspect of the invention comprises a clamp for connecting a first conduit to a second conduit comprising;
- a plurality of clamp segments;
- a flexible band in a substantially open circular shape connecting the segments;
- a clamp segment comprising a lug located at each end of the band; and
- an actuator extending through the lugs for opening and closing the clamp.

The clamp can comprise a removeable cartridge for housing the actuator.

A third aspect of the invention comprises a method of connecting the ends of first and second conduits using an apparatus as described above, the method comprising:

assembling the end of the first conduit into the frame assembly into the mounting point;
positioning the carrier in the first position;
positioning the end of the second conduit in the guide;
engaging first guide arms in the first guide formations;
pivoting the end of the second conduit around the first guide arms to engage second guide arms in the second guide formations;
moving the guide arms from the guide formations into the slots in the carrier;
moving the carrier to the second position so as to move the end of the second conduit against the end of the first conduit; and
forming a connection so as to secure the ends of the conduits together.

The method can further comprise securing the ends of the conduit together with a clamp as described above.

A fourth aspect of the invention comprises a method of deploying a second conduit from a vessel for connecting to a first conduit comprising:

attaching a clamp as described above to the second conduit;
positioning the second conduit in an open top channel extending from the vessel such that the fastener of the clamp extends into the open top of the channel;
guiding the second conduit through the channel; and
connecting the second conduit to the first conduit using the apparatus as described above.

The method to connect the second conduit to the first conduit can comprise:

assembling the end of the first conduit into the frame assembly into the mounting point;
positioning the carrier in the first position;
positioning the end of the second conduit in the guide;
engaging first guide arms in the first guide formations;
pivoting the end of the second conduit around the first guide arms to engage second guide arms in the second guide formations;
moving the guide arms from the guide formations into the slots in the carrier;
moving the carrier to the second position so as to move the end of the second conduit against the end of the first conduit; and
forming a connection so as to secure the ends of the conduits together.

BRIEF DESCRIPTION OF THE DRAWINGS

FIG. 17 shows a clamp structure for which the invention can be used in combination with.

MODE(S) FOR CARRYING OUT THE INVENTION

Figure 1:
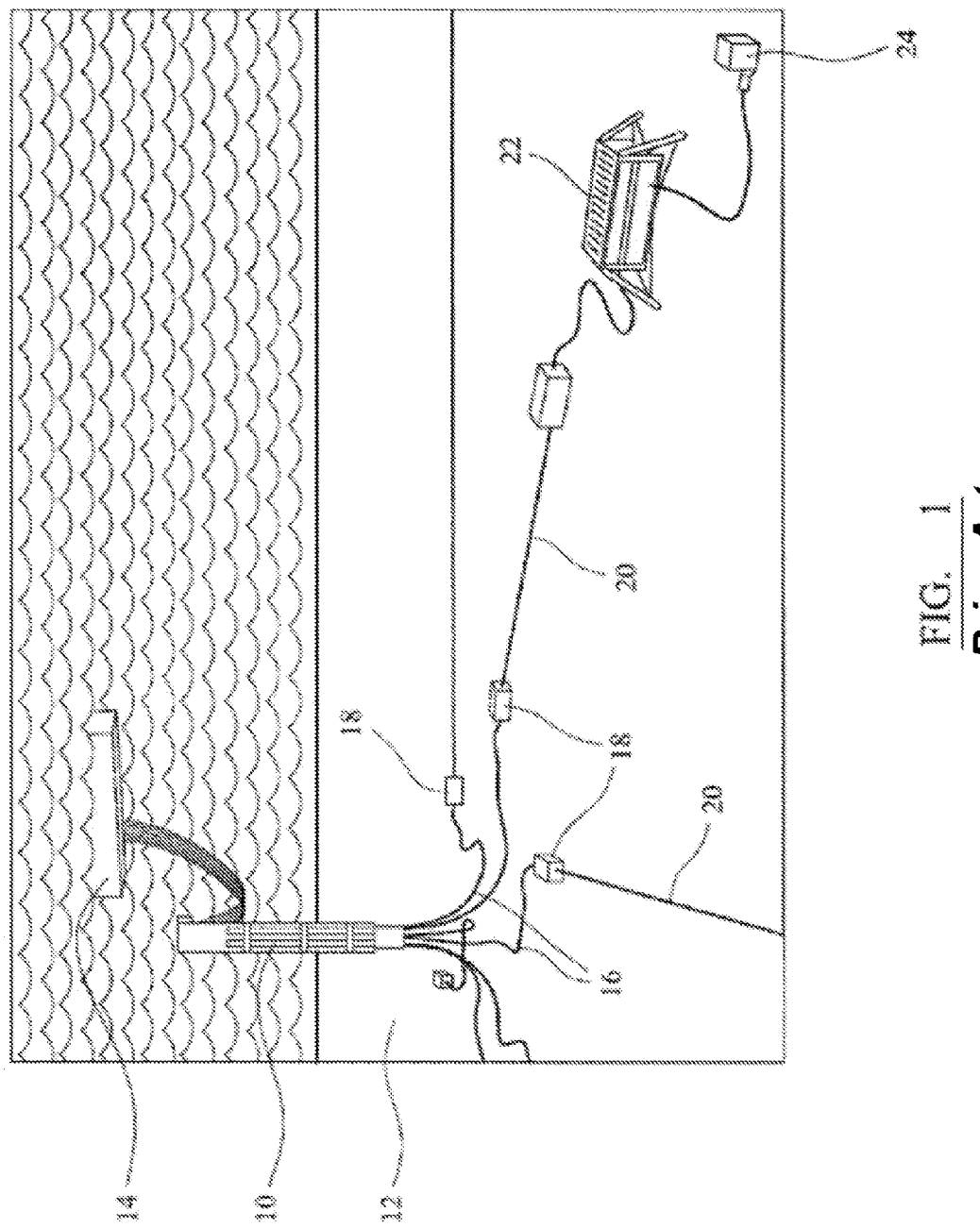
FIG. 1 shows a typical riser tower subsea installation comprising connections between conduits.
Figure 2:
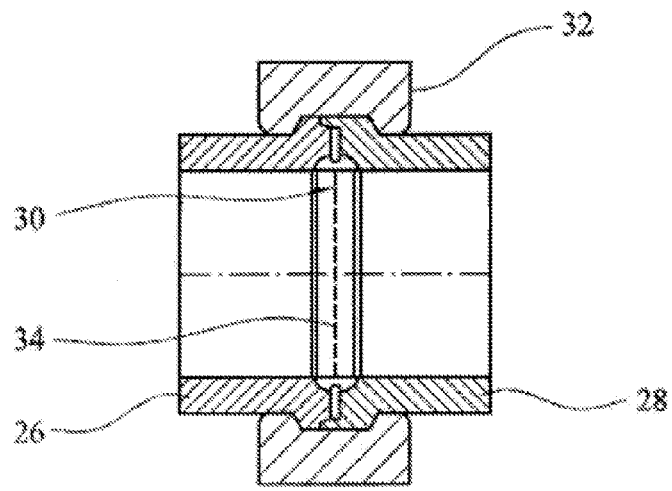
FIG. 2 shows a typical connection between two conduits.
Figure 3:
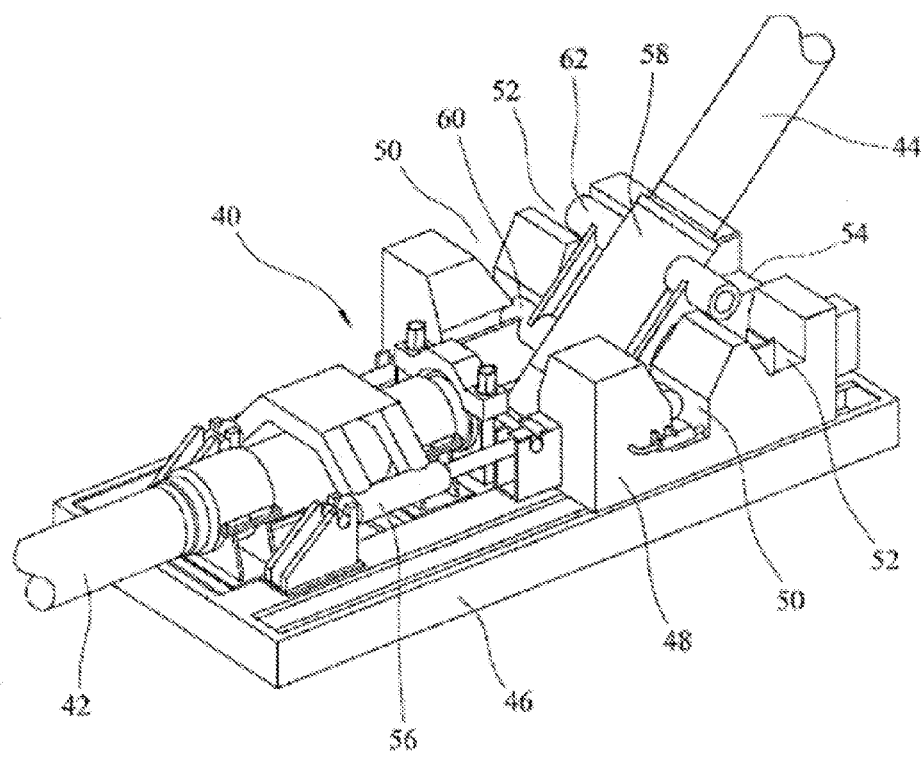
FIG. 3 shows a schematic diagram of the connection tool according to the invention.

FIG. 3 shows a connection tool 40 according to the invention for aligning and connecting a first conduit 42 to a second conduit 44. The connection tool 40 comprises a frame assembly 46 in which a fixed first conduit 42 already installed is attached. The frame assembly 46 comprises a guide 48, or alignment block, comprising a pair of side members and first 50 and second 52 pairs of guide formations. The guide formations 50, 52 are connected to a channel running along the length of the side members of the guide and are configured to receive guide arms 60, 62 of the second conduit. A carrier or slider 54, in which the second conduit 44 to be connected to the fixed conduit 42 is mounted, is slidably attached to the guide 48 and the frame assembly 46. The carrier 54 is positioned between a space defined by the side members of the guide 48 with longitudinal side walls of the carrier being located in the channels. The carrier is moveable between two positions. When the carrier is in the first position slots in the side walls of the carrier align with the guide formations and can receive the guide arms from the guide formations. The carrier is connected to a driving mechanism, such as rams 56 aligned parallel to the longitudinal axis of the fixed conduit 42 to move the carrier to its second position where the end of the second conduit is held against the end of the first conduit. The rams 56 are actuable to move the carrier 54 along the frame assembly 46 and channel to bring the end of the second conduit 44 into contact with the first conduit 42.

The end portion of the second conduit 44 to be connected to the fixed conduit 42 comprises an alignment head 58 having first 60 and second 62 pairs of guide arms extending radially out from the conduit 44. The guide arms 60, 62 are engagable with the guide formations 50, 52 on the guide 48 of the frame assembly 46.

Figure 4:
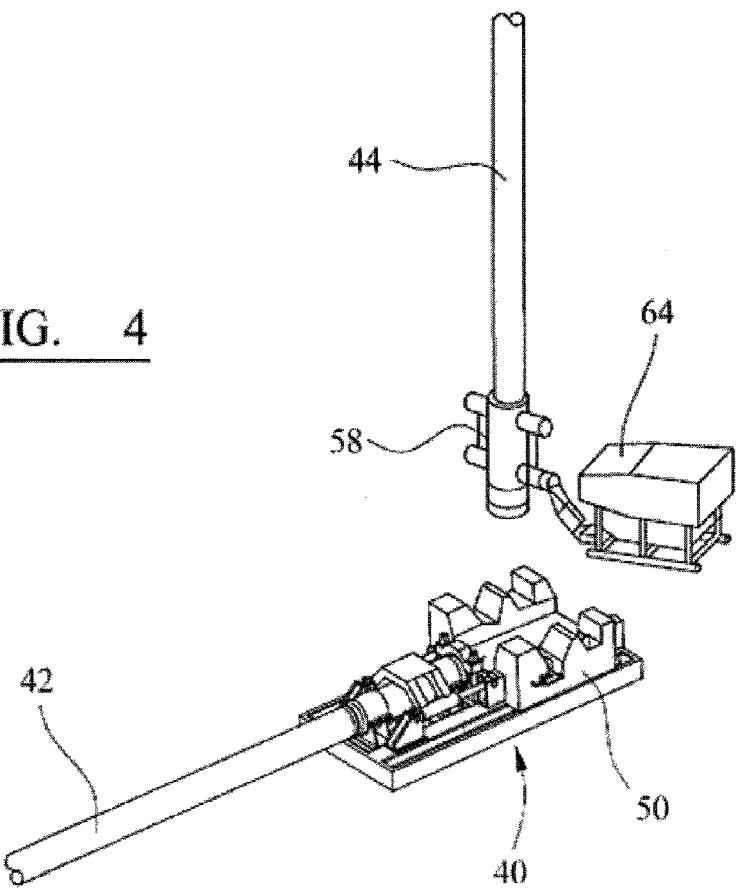
FIG. 4 shows a connection tool being used to connect one conduit to another in a subsea environment.

To connect a conduit to another conduit already installed using a connection tool 40 as shown in FIG. 3, a first conduit 42 is assembled in the connection tool 40, such that it is in a fixed stationary position. The second conduit 44 is bought towards the connection tool, to be placed in the tool. Depending on where the connection of the conduits is taking place, will depend on how the second conduit 44 is placed into the connection tool 40 and initially aligned with the fixed conduit 42. As shown in FIG. 4, in a subsea environment the initial alignment can be provided by a ROV 64. The ROV 64 guides the second conduit 44 to the connection tool 40 and provides manual intervention and guidance to the vessel watch keeper to guide the alignment head 58 of the conduit 44 into the guide 48 of the connection tool 40.

Figure 5:
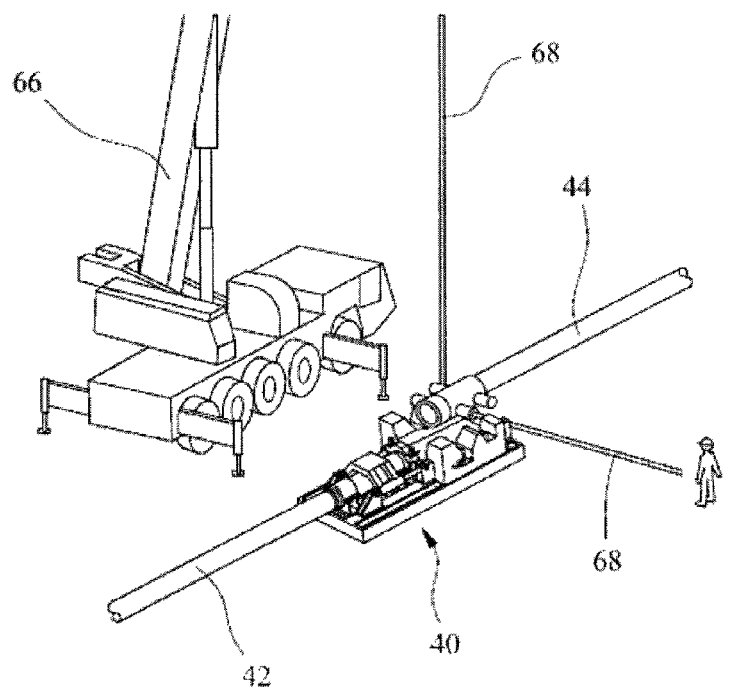
FIG. 5 shows a connection tool being used to connect one conduit to another in the surface environment.

On the surface, a crane 66 can carry the second conduit 44 to the connection tool. The initial alignment can be provided by a person providing manual intervention through tag lines 66 and verbal guidance to the crane operator to guide the alignment head 58 of the conduit 44 into the guide member of the 48 of the connection tool 40, as shown in FIG. 5. The initial contact between the second conduit 44 and connection tool 40, does not require accurate alignment and a rudimentary alignment to place the second conduit 44 into the connection tool 40 will suffice.

Once the second conduit has been bought into close proximity of the connection tool the second conduit 44 is moved so that the first guide arms 60 are located in the first guide formations 50. Once the first guide arms 60 are engaged in the first guide formations 50 the second pair of guide arms 62 can be moved in the second guide formations 52.

As the second conduit 44 is moved into the guide the second pair of guide arms 62 move into the second pair of guide formations 52. The first and second guide arms can pass through the first and second guide formations and locate in slots in the carrier 54. This aligns the central axis of the second conduit 44 being installed with the central axis of the fixed conduit 42. FIG. 3 shows the second conduit being installed from a vertical position into a final horizontal position. In this situation once the first guide arms 60 are engaged in the formations 50, the second conduit pivots about a point around the axis of the first guide arms and as the second conduit is lowered the second guide arms 62 are positioned into the second guide formations 52.

When the central axes of the two conduits are coaxially aligned rams 56 are actuated to pull the carrier 54 and hence the alignment head 58 and conduit 44 being installed towards the fixed conduit 42. The two conduits 42, 44 are bought together with sufficient force and intimacy to ensure that a sufficient seal between the conduits is retained until permanent closure of the two conduits is achieved. The force that brings the two conduits together may also activate other retention devices required by the content of the conduit.

As the carrier 54 moves towards the fixed conduit 42 the carrier is kept in position by the sides of the carrier moving along channels in the sides of the guide 48. With the guide arms 50, 52 extending into slots in the side of the carrier 54 at least a portion of the guide arms 50, 52 are also located in the channel of the guide. This helps place the central axis of the interface of the conduit 44 being installed within a sufficient tolerance, typically ±5 mm, of the centre axis of the interface of the fixed conduit 42.

Figure 6:
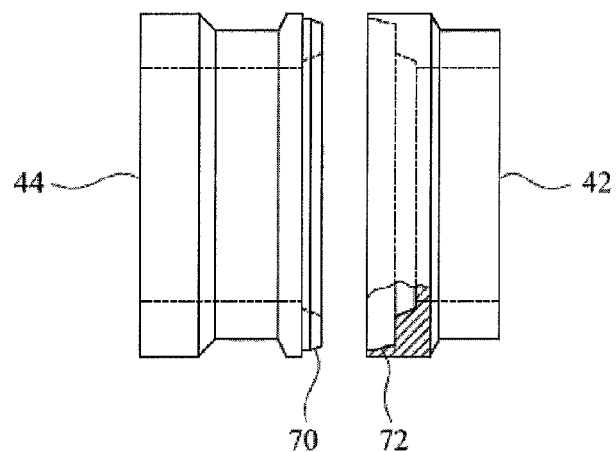
FIGS. 6-8 shows further alignment mechanism which can be used in combination with the connection tool of the invention.
Figure 7:
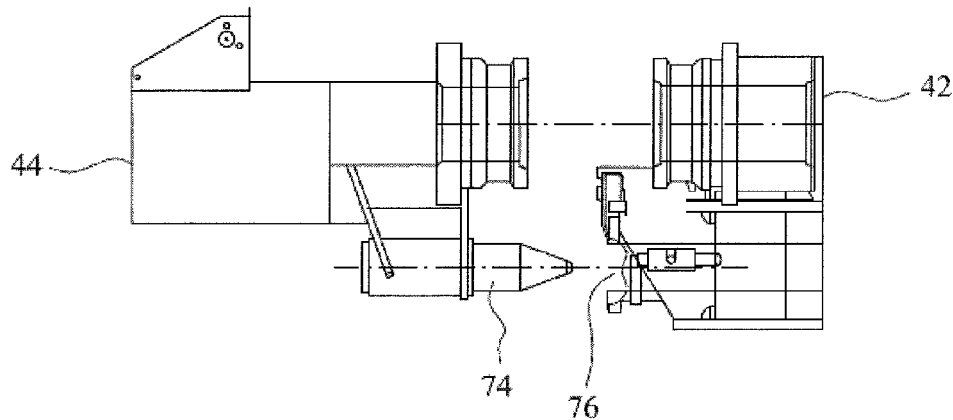
Figure 8:
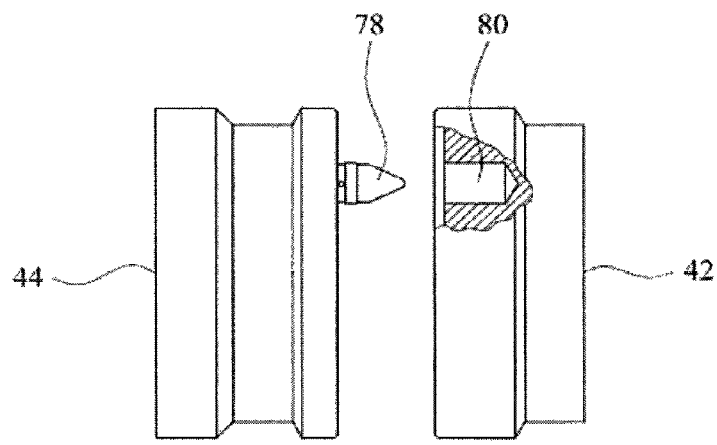

As the carrier continues to bring the conduit 44 being installed into a close proximity with the fixed conduit 42, other fine alignment mechanisms can be included in the mechanism, to help achieve sufficient alignment of the conduits. The nature of the conduits being connected and the contents contained in the conduits will determine whether closer alignment tolerances are required. FIGS. 6-8 exemplifies some possible fine alignment mechanisms compatible with the present invention.

As shown in FIG. 6 the conduits 42, 44 being installed can comprise complementary male 70 and female 72 tapered end faces to enable a close fit with each other. The male 70 end faces mating with the female 72 end face as the conduit to be installed 44 is bought into contact with the fixed conduit 42. With reference to FIG. 7 in another variation one conduit 44 can comprise a docking member 74 extending from its end face, with the other conduit 42 having a complementary aperture 76 into which the docking member 74 is inserted as the second conduit 44 is brought together with the fixed conduit 42. In this arrangement the fine alignment mechanism is separate from the interface of the conduits.

In another arrangement as shown in FIG. 8, a docking member 78 extends forward from the alignment head 58 of the conduit 44 to be installed, while a complementary locating aperture 80 is attached to the fixed conduit 42. The docking member 78 is inserted into the aperture 80 as the faces of the conduits are bought closer together. In this arrangement the fine alignment mechanism is separate from the interface of the conduits. Other suitable fine alignment mechanism can also be used with the connection tool.

Figure 9:
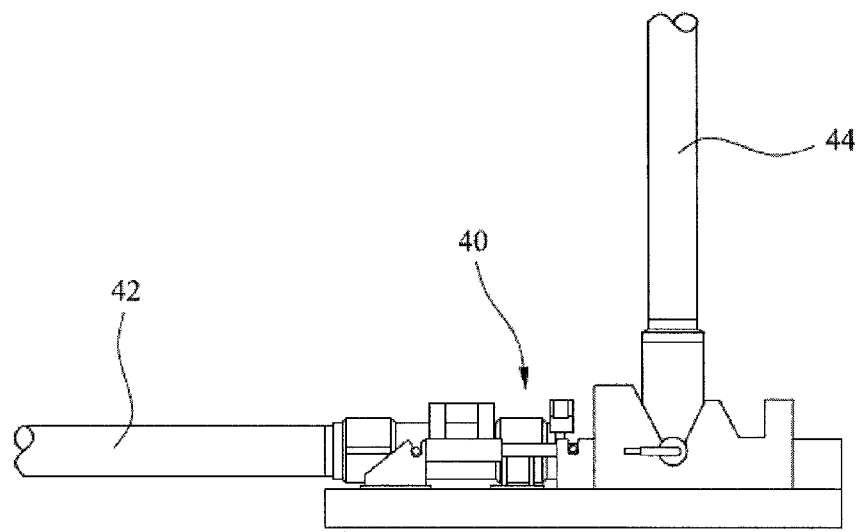
FIGS. 9-16 shows different orientations that the connection tool can be used to connect two conduits.
Figure 10:
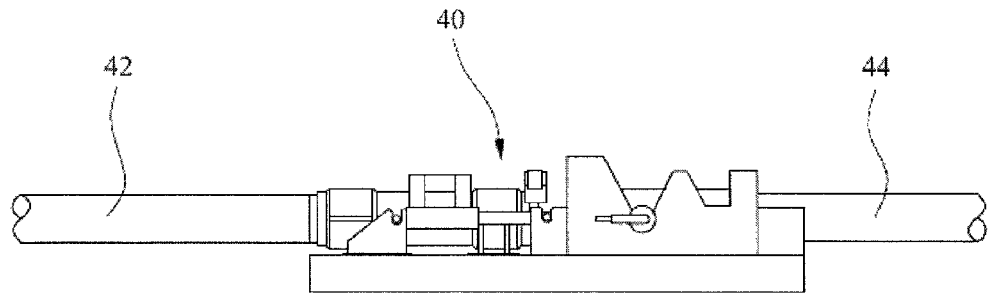
Figure 11:
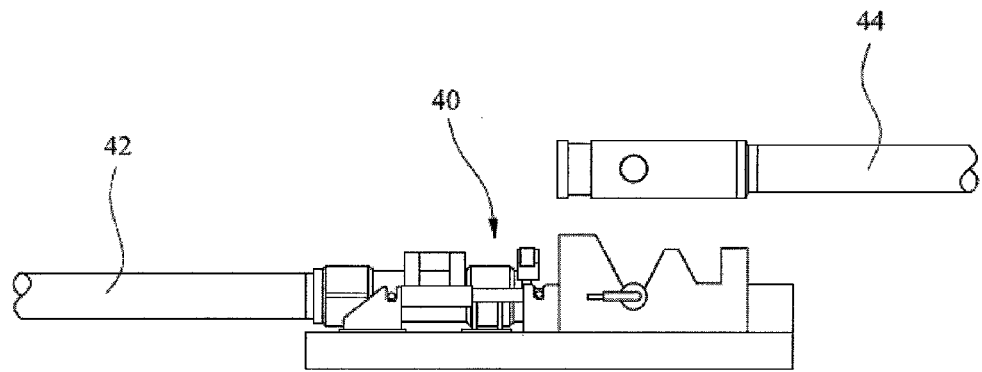
Figure 12:
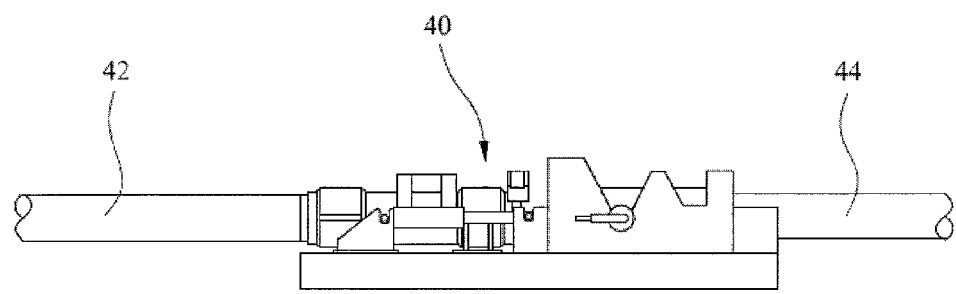
Figure 13:
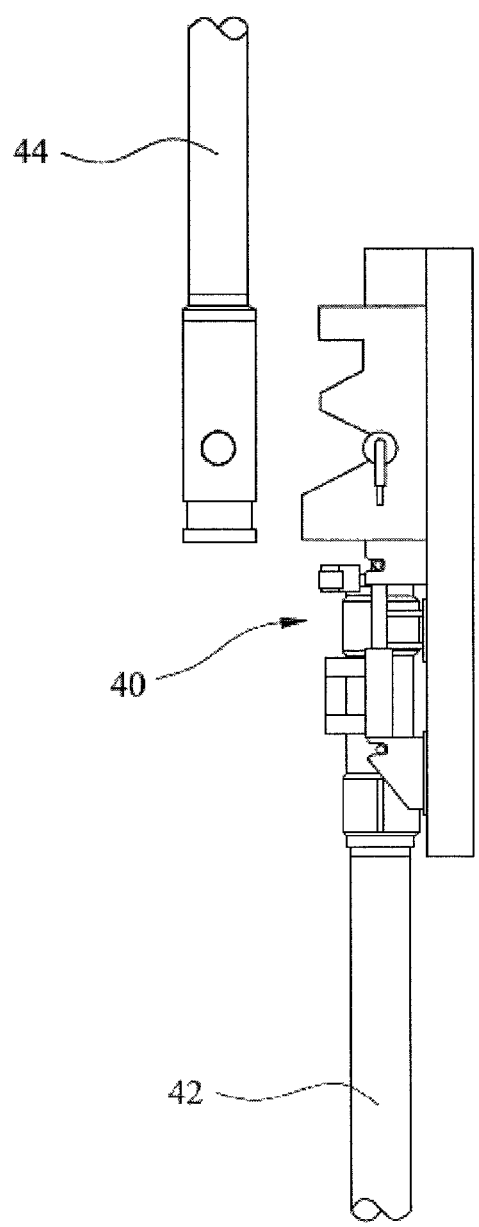
Figure 14:
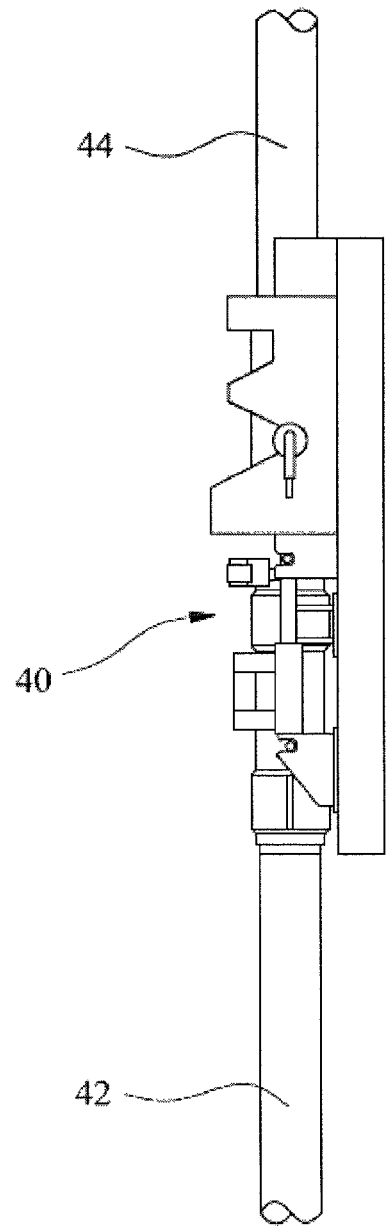
Figure 15:
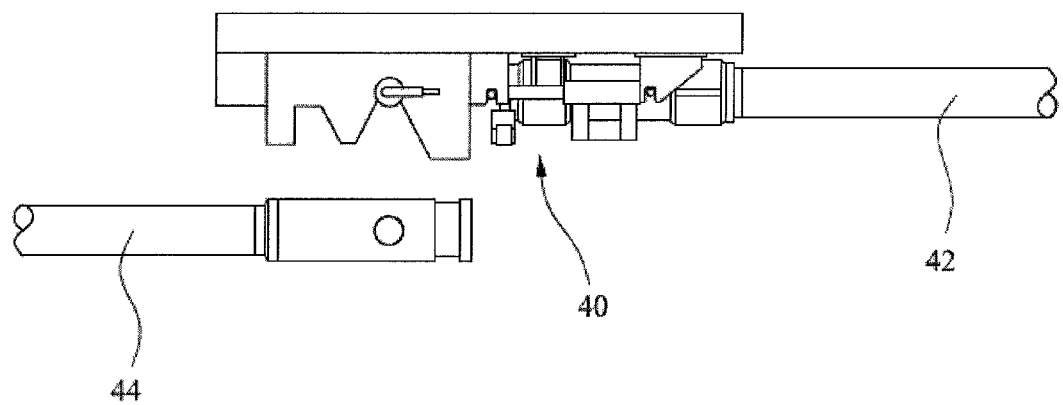
Figure 16:
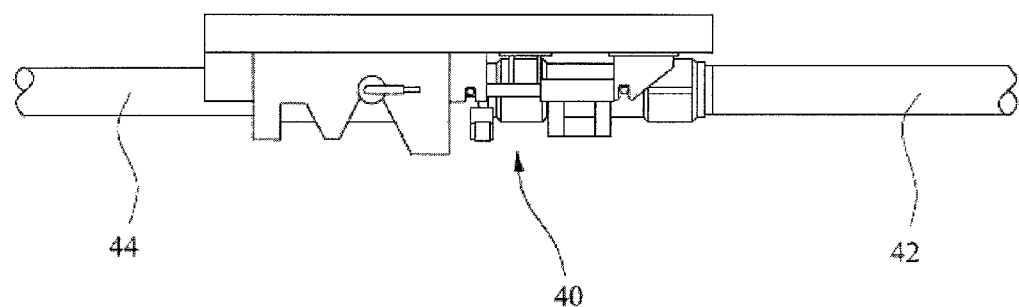

As illustrated in FIG. 3 the final position of the conduit is in a horizontal orientation however other orientations of the tool are also possible. FIGS. 9-16 shows examples of orientation where the connection tool can be used. As shown in FIGS. 9 and 10 the connection tool 40 can be used in a horizontal position where the second conduit 44 is being installed from a vertical position. FIGS. 11 and 12 show the connection tool 40 used in a horizontal position wherein the second conduit 44 is being installed from a horizontal position. The connection tool 40 can be used in a vertical position with vertical insertion of the second conduit 44 to vertically positioned first conduit 42 as shown in FIGS. 13 and 14. The connection can also be used in an upside down horizontal position, as shown in FIGS. 15 and 16, such that the second conduit 44 is raised to be inserted into the connection tool 40 having a horizontally aligned first conduit 42 connected.

Where the final orientation of the second conduit 44 is such that gravity would cause one or both of the first pair of guide arms 60 to disengage from one or both of the first guide formations 50, for example when the connection tool 40 is used in an "upside" down orientation as shown in FIGS. 15 and 16, the connection tool 40 can further comprise a retaining mechanism or latch mechanism (not shown) to retain the first pair of guide arms 60 in the first pair of guide formations 50. The retaining mechanism can prevent accidental disengagement of the guide arms during use.

Although the connection tool is applicable for the alignment of any conduit, the tool is particularly suitable for use with conduits of a size and/or stiffness such that the loads required to achieve alignment are very high. Typically these include large diameter pipelines used either subsea or on land, for the transmission of oil or gas, or for conduits with thick coatings of insulation or other protective media to provide mechanical protection for sensitive inner cores, e.g. fibre optic cable. The present invention is particularly suitable for use connecting conduits in remote locations. Such remote locations can include deepwater, arctic, jungle or other locations that may preclude normal preventative maintenance that is typically needed to ensure the mechanism will operate as intended over time.

It is preferred that the carrier is a separate component from the guide member and does not need to be a closely toleranced component of the connection tool. Having the carrier as a separate component allows the carrier to be formed from materials such as concrete, resin, fibreglass etc that will not corrode or otherwise deteriorate over time, i.e. materials not susceptible to processes which may affect metallic components over time. It also mitigates against the possibility of the carrier jamming in the guide member during long periods of inactivity, this ensures that the mechanism can be reused after long periods.

The rams that operate the carrier can be powered by electrics, hydraulics or other suitable media. In one embodiment the rams, and the leads and pipes etc required to power the rams, are detachable from the connection tool. This allows the rams and pipes to be removed from the connection tool after use and then restored to the tool when the sliding mechanism is next required to be actuated.

In one embodiment the clearances between the guide member, guide openings and the carrier are chosen such that the bending moments on the conduit to be installed are reacted through the guide formations into the frame assembly, and then onto the host structure if present, and thus not passed into the connector interface or the secure closure mechanism. This is particularly beneficial when joining large diameter and/or stiff conduits, as when such conduits are used the bending moments during connection is often the most severe loading experienced by the connector. By directing the bending moments into the host structure, the interface of the connection between the conduits is protected from the serve loads and the secure closure mechanism used to join the conduits can be smaller and lighter than would otherwise be the case, if greater loads had to be experienced.

Once the two ends of the conduit have been bought together the ends of the two conduits can be securely connected to join the conduits together. Typical closures for pipelines etc require that the conduits have a feature that provides a form of reaction point such that a clamp, collet or similar device can hold each side of the interface together. The closure device can be attached to the connection tool. In some embodiments the closure devices can be attached to the second conduit before connection of the second conduit to the first conduit.

Figure 17:
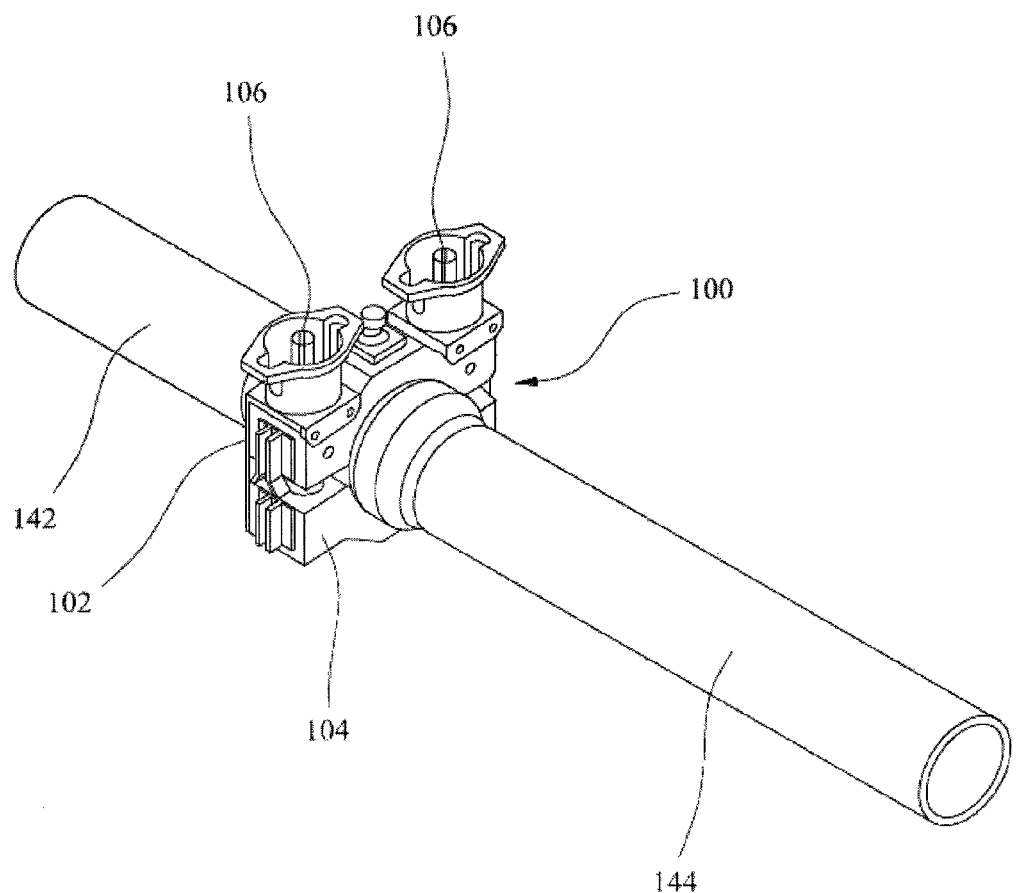
Figure 18:
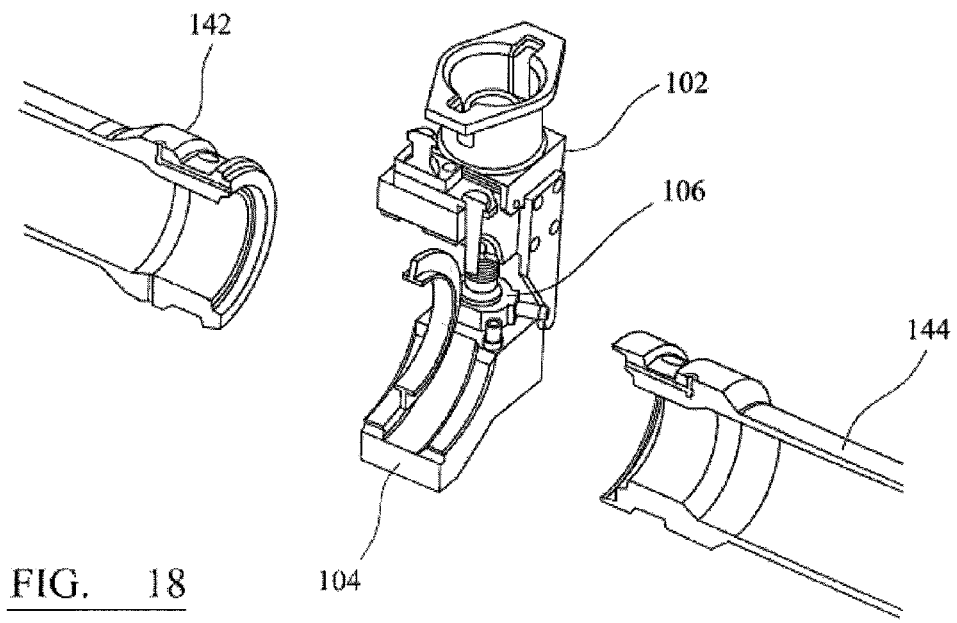
FIG. 18 shows an expanded view of a clamp for closure of the conduit connection.
Figure 19:
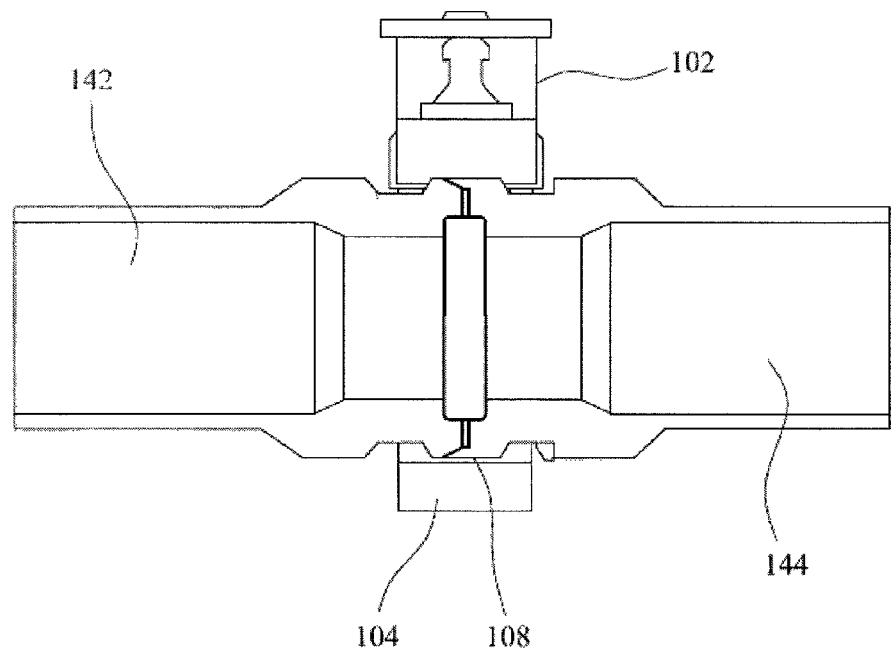
FIG. 19 shows a cross sectional view of a clamp for closure of the conduit connection

FIGS. 17 to 20 show arrangements of secure closure devices that can be used with the invention which force the clamp segments into engagement with formations of the ends of the conduits to secure the ends together. A typical closure device as shown in FIGS. 17 to 19 can comprise a clamp 100 having an upper half 102 and a lower half 104 pulled together by two bolts 106 or actuators. The clamp 100 locates over the profile on both sides of the hub 108 formed by the contact of the two conduits 142, 144. This holds the interface between the fixed conduit 142 and the conduit 144 to be installed securely in position.

Figure 20:
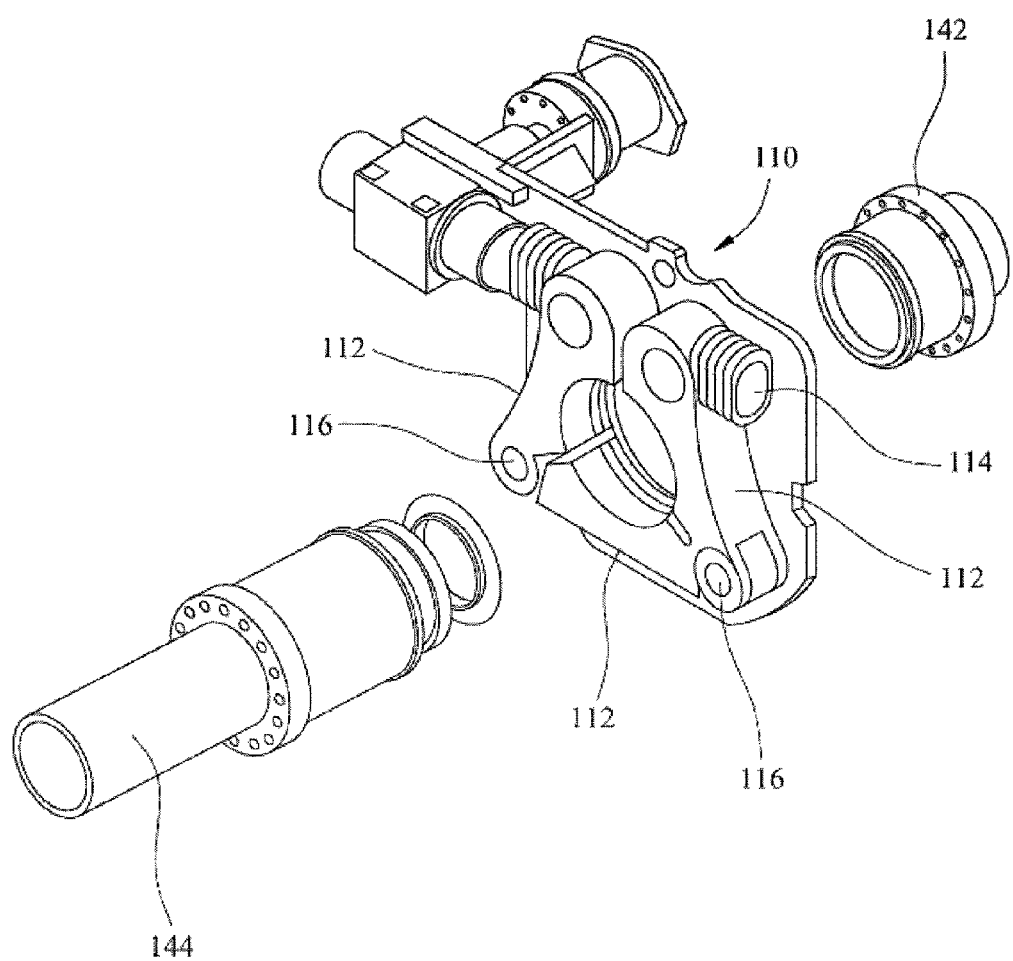
FIG. 20 shows an expanded view of a segment clamp for closure of a conduit connection.

In an alternate embodiment shown in FIG. 20 the closure mechanism can be a single bolt clamp 110. Such a clamp may comprise three segments 112 with the single bolt 114 fastening two of the segments 112 together while the remaining connection between the segments are hinge members 116. The use of a single bolt clamp can allow the closure to be configured with the bolt at the top of the clamp, and a single tool can be used to apply torque to the bolt to operate the clamp. This is beneficial in a remote location as this simplifies the closing and tightening of the clamp.

Figure 21:
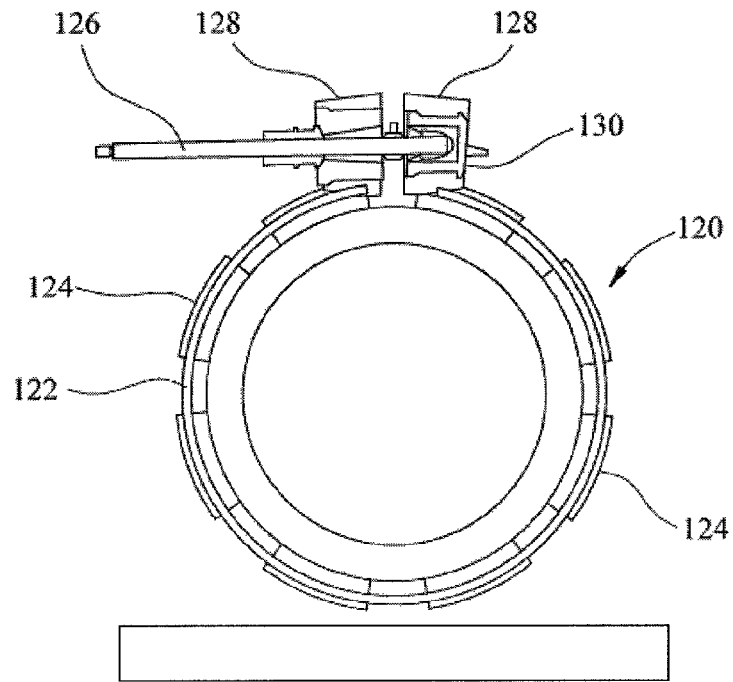
FIG. 21 shows a schematic diagram of segmented clamp in a closed position according to the invention.
Figure 22:
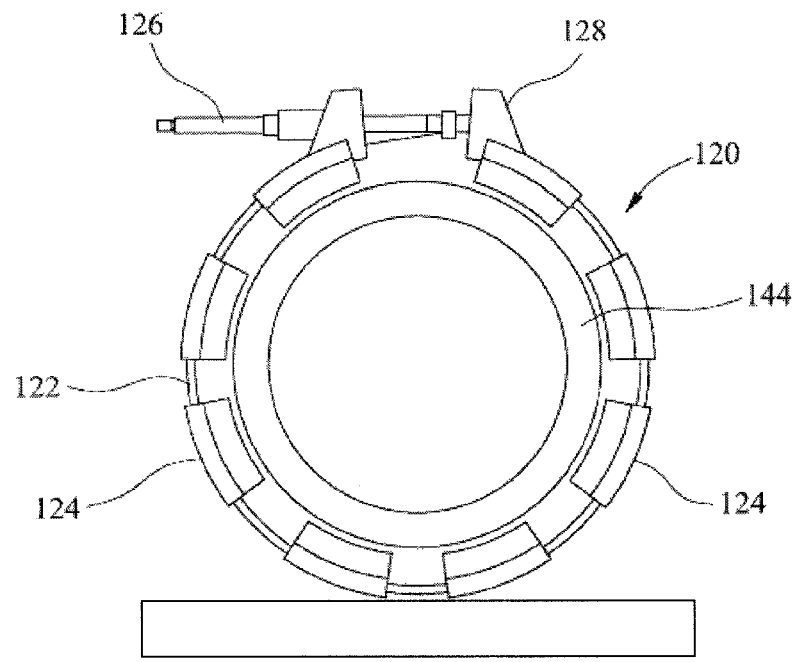
FIG. 22 shows a schematic diagram of a segmented claim in an open position according to the invention.

In a further embodiment a secure closure device that can be used with the invention is shown in FIGS. 21 and 22. The clamp 120 comprises a flexible metal band 122 joining a plurality of clamp segments 124 together and lugs located at each end of the band. A fastening mechanism including a single bolt 126 fastens the clamp lugs 128 together and is operated to open and close the clamp 120. The fastening mechanism can comprise a removable cartridge block which houses at least part of the shaft of the bolt and the nut.

The band provides flexibility in the clamp so it can be opened (FIG. 22) and closed (FIG. 21) sufficiently to allow the hub of the conduit to pass through the aperture formed by the band and clamp segments and to ensure that no moving parts will be located under the conduit. When the clamp is in an open position it allows the hub of the conduit being installed to pass through the clamp.

When the bolt is tightened the ends of the band are brought to together and the clamp segments 124 engage the hub of the two conduits contacting each other to secure the conduits together. The bolt 126 is secured into the clamp lugs 128 with a removable cartridge 130.

The cartridge block can be sheared out of the lugs of the clamp removing the shaft and nut from the clamp as the cartridge is removed from the lug. This enables the bolt to be retrieved independently from the clamp. As the moveable parts required to operate the clamp are contained within the cartridge, this provides a closure mechanism whereby fallible components of the clamp operating mechanism are replaceable, or removable for refurbishment. This makes the device particularly suitable for use in remote locations where access for maintenance is difficult.

Other suitable non-metallic materials can also be used to form the band. The clamp retains the connection of the conduits in a closed position and the clamp segments are able to resist both internal and external loading that the connection may be subjected to throughout its service life. Providing a plurality of clamp segments that are spaced apart around the flexible band can help keep the weight and size of the clamp down.

A conduit can be deployed to the connection tool with the clamp 120 already located on the second conduit. In a closed position the clamp fits closely around the circumference of the conduit. As the connection tool can comprise an open top, components connected to the second conduit, such as the clamp, will not hinder the positioning of the second conduit into the tool. The clamp can be positioned on the conduit with the actuating mechanism retained on the top of the second conduit, such that no moving parts of the clamp will be located under the conduit when in the connection tool and the clamp can be easily accessed for the opening and closing of the clamp to secure the first and second conduits together. Locating the actuating mechanism on the top of the pipe also enables easier access for maintenance of the clamp operating mechanism.

When laying a pipeline on the seabed a vessel is fitted with an open top channel such as a stinger, which guides the pipeline as it is deployed from the vessel down to the seabed. When large diameter pipelines are deployed through the channel the internal diameter of the channel is often only slightly larger than the external diameter of the pipeline to be deployed. This leads to a difficulty in fitting any further components to the outside of the pipe to be deployed together with the pipeline.

The clamp can fit closely around the circumference of the pipeline with the actuating mechanism of the clamp located at the top of the conduit, such that the actuating mechanism extends out the top of the channel. This enables the pipeline with the clamp attached to be guided through the stinger as the pipeline is deployed from the vessel to the seabed. As the actuating mechanism can extend out towards the open top of the channel, the size of the actuating mechanism is not restricted by the diameter of the channel. A clamp can be used which provides sufficient strength to the connections to resist both internal and external loading that the connection may be subjected to.

Further changes can be made without departing from the scope of the invention.

The invention claimed is:

1. An apparatus for connecting adjacent ends of first and second conduits comprising:
   a frame assembly including a mounting point for mounting the end of the first conduit in a fixed position;
   a guide connected to the frame assembly comprising a pair of side members defining a space therebetween for receiving the end of the second conduit and first and second guide formations for receiving guide arms attached to the end of the second conduit provided in each side member, and wherein each side member includes a channel, the guide formation in each side member opening into the respective channel; and
   a moveable carrier mounted on the frame assembly and including slots for engaging the guide arms, the carrier slideable within the channels so as to be moveable between a first position in which the slots align with the guide formations so that the guide arms can pass into the slots, and a second position in which the end of the second conduit is held against the end of the first conduit so as to allow a connection to be formed to secure the ends together.

2. An apparatus as claimed in claim 1, wherein the slots in the carrier locate the guide arms such that the end of the second conduit is positioned coaxially with the end of the first conduit fixed to the frame.

3. An apparatus as claimed in claim 1, wherein a drive mechanism is fixed to the frame assembly and connects to the carrier and is operable to move the carrier between the first and second positions.

4. An apparatus as claimed in claim 3, wherein the drive mechanism is detachable from the carrier.

5. An apparatus as claimed in claim 1, further comprising a closure mechanism connected to the frame assembly and operable to form the connection to secure the ends of the conduits together when the end of the second conduit is in the second position.

6. An apparatus as claimed in claim 5, wherein the closure mechanism comprises a clamping assembly including a plurality of clamp segments and an actuating mechanism operable to force the clamp segments into engagement with formations on the ends of the conduits to secure the ends together.

7. An apparatus as claimed in claim 5, wherein the closure mechanism comprises a pair of clamp segments and a pair of actuators extending between the clamp segments on either side of the connection.

8. An apparatus as claimed in claim 5, wherein the closure mechanism comprises clamp segments mounted on a mounting member by hinges and connected to each other by an actuator.

9. An apparatus as claimed in claim 5, wherein the closure mechanism comprises clamp segments connected by a flexible band that can pass around the ends of the conduits, the band having a lug at each end and an actuator extending between the lugs.

10. An apparatus for connecting adjacent ends of first and second conduits comprising:
a frame assembly including a mounting point for mounting the end of the first conduit in a fixed position;
a guide connected to the frame assembly and including first and second guide formations for receiving guide arms attached to the end of the second conduit and
a moveable carrier mounted on the frame assembly and including slots for engaging the guide arms, the carrier being moveable between a first position in which the slots align with the guide formations so that the guide arms can pass into the slots, and a second position in which the end of the second conduit is held against the end of the first conduit so as to allow a connection to be formed to secure the ends together, wherein the guide formations include retaining mechanisms to prevent accidental disengagement of the guide arms during use.

11. A method of connecting the ends of first and second conduits using an apparatus comprising:
a frame assembly including a mounting point for mounting the end of the first conduit in a fixed position;
a guide connected to the frame assembly and including first and second guide formations for receiving guide arms attached to the end of the second conduit and
a moveable carrier mounted on the frame assembly and including slots for engaging the guide arms, the carrier being moveable between a first position in which the slots align with the guide formations so that the guide arms can pass into the slots, and a second position in which the end of the second conduit is held against the end of the first conduit so as to allow a connection to be formed to secure the ends together, the method comprising:
assembling the end of the first conduit into the frame assembly into the mounting point;
positioning the carrier in the first position;
positioning the end of the second conduit in the guide;
engaging first guide arms in the first guide formations;
pivoting the end of the second conduit around the first guide arms to engage second guide arms in the second guide formations;
moving the guide arms from the guide formations into the slots in the carrier;
moving the carrier to the second position so as to move the end of the second conduit against the end of the first conduit; and
forming a connection so as to secure the ends of the conduits together.

12. A method according to claim 11 further comprising securing the ends of the conduit together with a clamp, the clamp including a plurality of clamp segments, a flexible band in a substantially open circular shape connecting the segments, a clamp segment comprising a lug located at each end of the band, and a fastener extending through the lugs for opening and closing the clamp.

13. A method of deploying a second conduit from a vessel for connecting to a first conduit comprising:
attaching a clamp to the second conduit, wherein the clamp comprises a plurality of clamp segments; a flexible band in a substantially open circular shape connecting the segments; a clamp segment comprising a lug located at each end of the band; and a fastener extending through the lugs for opening and closing the clamp;
positioning the second conduit in an open top channel extending from the vessel such that the fastener of the clamp is located on top of the second conduit and extends into the open top of the channel;
guiding the second conduit through the channel; and
connecting the second conduit to the first conduit using an apparatus including
a frame assembly including a mounting point for mounting the end of the first conduit in a fixed position,
a guide connected to the frame assembly and including first and second guide formations for receiving guide arms attached to the end of the second conduit, and
a moveable carrier mounted on the frame assembly and including slots for engaging the guide arms, the carrier being moveable between a first position in which the slots align with the guide formations so that the guide arms can pass into the slots, and a second position in which the end of the second conduit is held against the end of the first conduit so as to allow a connection to be formed to secure the ends together, comprising:
assembling the end of the first conduit into the frame assembly into the mounting point;
positioning the carrier in the first position;
positioning the end of the second conduit in the guide;
engaging first guide arms in the first guide formations;
pivoting the end of the second conduit around the first guide arms to engage second guide arms in the second guide formations;

moving the guide arms from the guide formations into the slots in the carrier;

moving the carrier to the second position so as to move the end of the second conduit against the end of the first conduit; and forming a connection so as to secure the ends of the conduits together.

\* \* \* \* \*